United States Patent Office 2,999,747
Patented Sept. 12, 1961

2,999,747
METHOD OF TREATING REFRACTORY ORES FOR THE RECOVERY OF VALUES THEREFROM
Anthony R. Ronzio, Littleton, Colo., assignor to Radiological Research Institute, Inc., Denver, Colo., a corporation of Nevada
No Drawing. Filed Oct. 28, 1958, Ser. No. 770,014
6 Claims. (Cl. 75—1)

This invention is directed to a method of treating ores for the recovery of the metal values and more particularly to a method of treating refractory ores.

The recovery of the metals from an ore by simple reduction may only be applied successfully to a few of the common elements. Iron, copper, lead and zinc, for example, may be recovered from their ores fairly simply by heating the common ores of these elements with carbon and a flux to give the metal itself as the final product.

Many ores, among which may be listed those of beryllium, tungsten, rare earths, columbium and tantalum are not amenable to such a simple treatment. This may be due to a number of factors. The metal may have such a high melting point that it will not flow and, hence, cannot be isolated or the metal itself may combine with carbon at the reduction temperature. Then again, the metal may be in such a stable combination that the usual reducing agents are without effect.

Such ores then will require a solubilizing process whereby the metals are put into solution from which they may be isolated by chemical procedures.

The solubilizing step is the critical stage in all such procedures. The reagents necessary to bring refractory ores into solution are usually such that they will damage the walls of the kilns, crucibles or other containers in which the reaction may take place.

It is an object of this invention, therefore, to provide an improved method of treating ores and particularly refractory ores, which avoids one or more of the disadvantages of prior art methods and which has increased efficiency.

It is a further object of this invention to provide an improved method of treating refractory ores to solubilize the values thereof in an economical and rapid manner without the usual attendant destruction of the kiln, crucible or other container for the reaction while providing highly efficient recovery.

In accordance with the invention, a refractory ore in a finely ground state is mixed with an amount of a strong oxidizing agent and an amount of a carbonaceous reducing material. This mixture is fired until fusion occurs. The fused cake is powdered and the particular values treated with appropriate reagents to render them amenable for recovery.

As the oxidizing agent, it has been found that the nitrates, persulphates and peroxides are to be preferred, however, other strong oxidizing agents may be used so long as they do not adversely affect the reaction. As carbonaceous reducing material, it is contemplated that any form may be used such as charcoal, coal, coke, crude oil charcoal, sawdust and the like.

While it is contemplated that the instant method is applicable to a great many refractory type ores such as those of beryllium, tungsten, rare earths, columbium and tantalum, the method will be explained in detail as applying to the treatment, for example, of tungsten and rare earth ores.

EXAMPLE A 20 grams of a tungsten ore, containing 25.2% $WO_3$, ground to pass a 60 mesh screen was thoroughly mixed with 30 grams powdered coal. This mixture was placed in an iron pan and fired to bring about oxidation and fusion according to the following equation:

I. $4NaNO_3 + 6C + O_2(air) = 2Na_2CO_3 + 4CO_2 + 2N_2\uparrow + heat$

This reaction releases about 8000 calories of heat per gram of carbon. The heat generated is sufficient to fuse the sodium carbonate which reacts with the tungsten ore (ferberite) as follows:

II. $NaCO_3 + FeWO_4 = NaWO_4 + FeCO_3$

The fused cake was crushed in a mortar, transferred to a beaker and treated with a liter of water. The aqueous mixture was warmed slightly and treated with 1 ml. of concentrated $NH_4OH$, 1 gm. $MgSO_4$ and 5 ml. sodium hypochlorite solution. The mixture was allowed to stand overnight. The sodium tungstate formed in the reaction is soluble and goes into solution. The mixture was then filtered and the filtrate acidified with hydrochloric acid in an amount sufficient to precipitate substantially all the tungstate as tungstic acid. Nitric acid may be substituted directly for hydrochloric and sulphuric acid may be used unless there results an objectionable amount of insoluble sulfate. The precipitated tungstic acid was then filtered, washed well with water acidified with nitric acid and dried. The filter cake was then ignited to tungstic oxide ($WO_3$) and weighed. Recovery was 93.5% based on 25.2% $WO_3$ in the ore treated. The tungstic oxide may be treated to recover the metallic tungsten by any one of several methods well known in the art.

Table 1, below, illustrates several runs made on tungsten ores using the method of the instant invention.

*Table I*

TUNGSTEN ORE

| Run No. | Wt. Ore, g. | Wt. Oxidizing Agent ($NaNO_3$), g. | Wt. Reducing Agent (Coal), g. | Percent $WO_3$ | Percent Recovery | Remarks |
|---|---|---|---|---|---|---|
| 1 | 20 | 30 | 13 | 25.2 | 93.5 | |
| 2 | 20 | 20 | 20 | 26.96 | 100.0 | Added 4 g. $N_2O_2$. |
| 3 | 20 | 10 | 5 | 25.7 | 95.4 | Added 1 g. $Na_2O_2$. |
| 4 | 20 | 10 | 3 | 25.7 | 95.4 | Added 1 g. $Na_2O_2$, Added 5 g. $Na_2CO_3$, Anh. |
| 5 | 40 | 20 | 3 | 26.96 | 100.0 | Added 2 g. $Na_2O_2$ Recovered 26.88% first heat. Recovered 0.08% on check for recovery. |

An amount of $Na_2O_2$ was added to certain of the runs to give a more basic reaction to the melt and $Na_2CO_3$ was added to run 4 to provide a higher concentration thereof for the reaction. An amount of ammonium hydroxide and magnesium sulfate are added to the water slurry of the crushed fused cake sufficient to remove any phosphoric acid which would form insoluble phosphates. An amount of sodium hypochlorite is added to oxidize a small amount of a colored organic compound resulting from the coal to remove the color if objectionable.

EXAMPLE B 20 grams of a rare earth oxide ore (14.8% REO) ground to pass a 60 mesh screen was thoroughly mixed with 20 grams of sodium nitrate and 20 grams of powdered coal. This mixture was ignited in an iron pan. As the fusion reaction (Equation I) takes place, the sodium carbonate fuses and reacts with the REO ore as follows:

III. $3Na_2CO_3 + R_2(SiO_3)_3 = R_2(CO_3)_3 + 3Na_2SiO_3$

In Equation III, R represents the trivalent rare earth element. After the reaction was complete, the product was cooled and crushed. The crushed product was then thoroughly leached with hot water until all sodium salts were washed from residue to prevent the possibility of forming sodium-rare earth alums which are insoluble. The leach residue was then put into solution in a minimum amount of hot 10% sulfuric acid. The resulting solution was allowed to stand overnight, then decanted and filtered. Any residue was washed several times with hot water. The filtrate was warmed and treated with an excess of oxalic acid and again allowed to stand overnight. The rare earth oxalates separate as an insoluble precipitate which is filtered off, dried and ignited. The mixture of rare earth oxides is recovered as a brownish powder. A total recovery of 63.4% was achieved by retreating the residue by the same method to recover an additional 20.50%. The rare earth oxalates may be treated by any one of several methods well known in the art to separate and recover the individual rare earths or their compounds.

Table 2, below, illustrates a number of runs made using the method of the instant invention.

Table 2
RARE EARTH ORES

| Run No. | Wt. Ore, g. | Wt. Oxidizing Agent (NaNO₃), g. | Wt. Reducing Agent (Coal), g. | Percent REO | Percent Recovered | Remarks |
|---|---|---|---|---|---|---|
| 1 | 20(−60) | 20 | 20 | 14.8 | 63.4 | Residue retreated, 20.5%. |
| 2 | 20(−30+60) | 20 | 20 | 12.13 | 52 | Residue retreated, 21.92%. |
| 3 | 20 | 40 | 20 | 8.69 | 35.5 | Added 5 g. Na₂CO₃. |
| 4 | 20 | 20 | 10 | 20.9 | 90.5 | Added 1 g. Borax. |
| 5 | 20 | 20 | 10 | 21.40 | 91.5 | Added 1 g. Borax, added 1 g. Na₂O₂. |
| 6[1] | 20(−60) | 10 | 5 | 33.40 | ? | Added 1 g. Borax, added 1 g. Na₂O₂ Redissolved and reprecipitated. |
| 7 | 20(−60) | 30 | 13 | 23.4 | 100 | Added 1 g. Borax, some Ca came down. |

[1] Some Ca ppted.

The runs of Table 2 were made on a calcium-rare earth ore known as yttrio fluoride. In such an ore a great deal of the calcium may come down as the oxalate and the ignited oxide must be redissolved, reprecipitated and ignited. The percentage of rare earth oxide in this ore was determined by X-ray fluorescence analysis, as is well understood in the art. In this method, an ore sample is activated to emit X-rays and from the wave length and intensity of the emissions the quantity of individual rare earth elements and total REO is determined.

The percentage figures in the column for runs 1 and 2 of Table 2 are the percentage recovered prior to retreatment. In retreating, the dried residue was given the same treatment as originally used. Borax or equivalent may be added to react with any fluorine compounds present and liberate rare earths from their fluorides.

Using the process of the present invention for the recovery of other metals from their silicate ores as metal carbonate, the sodium carbonate fuses at the temperature of the oxidation as in Equation I, and reacts with metal silicate as follows (Equation IV):

IV. $Na_2CO_3 + MSiO_3 = Na_2SiO_3 + MCO_3$

The silica is removed as water soluble sodium silicate leaving insoluble metal carbonate which is recoverable by leaching out the silicate. An important aspect of the instant invention, which permits recovery of high melting point metal values from their ores without the usual stringent requirements on equipment, is the formation of sodium carbonate in situ with the crushed ore accompanied by the evolution of sufficient heat to fuse the carbonate thus formed and to react with the values.

An experiment was conducted with a yttriofluoride ore to test the efficiency of the method of the instant invention applied to ores ground to various degrees of fineness. The results are shown in Table 3.

Table 3
RARE EARTH ORE 18.9% REO

| Run No. | Wt. Ore, gms. | Mesh Size | Wt. Oxidizing Agent (NaNO₃), gms. | Wt. Reducing Agent (Coal), gms. | Wt. Borax, gms. | Wt. Na₂O₂, gm. | Percent Found | Remarks |
|---|---|---|---|---|---|---|---|---|
| 1 | 20 | +30 | 10 | 3 | 2 | 1 | 8.2 | Melt very hard. |
| 2 | 20 | −30+60 | 10 | 3 | 2 | 1 | 15.5 | Melt easily removed. |
| 3[1] | 20 | −60 | 10 | 3 | 2 | 1 | 19.7 | Friable melt, some Ca ppted. |

[1] Some Ca ppted.

The results of Table 3 indicate that for best results the ore should be ground to pass a 30 mesh screen, but recovery is improved by finer grinding.

While the method of the instant invention has been illustrated by the treatment of specific ores, it will be appreciated that the process is applicable in general to the treatment of ores to recover the values therefrom where either an oxidizing, neutral or reducing effect in a basic media are necessary for the treatment of an ore.

While there have been described what at present are considered to be the preferred embodiments of the invention, it will be obvious to those skilled in the art that various changes and modifications may be made therein as dictated by the needs of a particular ore without departing from the invention. It is aimed, therefore, in the appended claims to cover all such changes and modifications which fall within the true spirit and scope of the invention.

What is claimed is:

1. A method of recovering metal values from refractory ores which comprises the steps of reacting together a carbonaceous reducing agent and a strong oxidizing agent selected from the group consisting of alkali metal nitrates, alkali metal persulphates and alkali metal peroxides in the presence of the refractory ore, the oxidizing agent and amount thereof being selected to react with the carbonaceous reducing agent to form an alkali metal carbonate and heat, the heat of reaction being operative to fuse the alkali metal carbonate, reacting the fused alkali metal carbonate with the ore at an elevated temperature, the elevated temperature being due to the heat of reaction, to produce an insoluble metallic carbonate and soluble alkali compound, and thereafter leaching to separate the soluble alkali compound and insoluble metallic carbonate.

2. The method of claim 1 wherein the ore is ground to substantially completely pass a 30 mesh screen and the oxidizing agent is an alkali metal nitrate.

3. In a method of recovering tungsten values from an ore containing same comprising the steps of grinding the ore to approximately 30 mesh, adding to and mixing with the ground ore an amount of an oxidizing agent selected from the group consisting of alkali metal nitrates, alkali metal persulphates and alkali metal peroxides and a carbonaceous reducing agent sufficient to produce at least one mole of an alkali metal carbonate for each mole of tungstate in the ore, heating the mixture to promote an initial reaction between the oxidizing agent and carbonaceous reducing agent to produce a fused alkali metal carbonate and heat, and immediately reacting the carbonate formed in situ and the tungsten values at an elevated temperature, the elevated temperature being due to the heat of reaction, to produce a fused cake composed of an insoluble metallic carbonate and a soluble tungstate compound, cooling the fused cake, crushing the cake, water leaching the tungsten values from the crushed cake and recovering the tungsten values.

4. The method of claim 3 wherein the oxidixing agent is sodium nitrate added in the amount of from about 2 to about 6 parts by weight for each part of $WO_3$ in the ore and the reducing agent is added in an amount sufficient to provide at least about 3 moles of carbon for each 2 moles sodium nitrate.

5. A method of recovering rare earth metal values from their ores comprising the steps of grinding the ore to approximately 30 mesh, adding to and mixing with the ground ore an amount of an oxidizing agent selected from the group consisting of alkali metal nitrates, alkali metal persulphates and alkali metal peroxides and a carbonaceous reducing agent sufficient to produce at least three moles of an alkali metal carbonate for each two average atomic weights of rare earth metal in the ore, heating the mixture to promote an exothermic reaction between the oxidizing and reducing agents to produce the alkali metal carbonate and heat, and reacting the carbonate formed in situ and the rare earth metal values at an elevated temperature, the elevated temperature being due to the heat of reaction, to produce a fused cake composed of a soluble alkali compound and an insoluble rare earth carbonate, cooling and crushing the cake, water leaching the crushed cake and recovering the rare earth metal values from the residue as an unsoluble precipitate.

6. The method of claim 5 wherein the oxidizing agent is sodium nitrate added in the amount of from about 5 parts to about 10 parts by weight for each part of rare earth metal in the ore and the reducing agent is added in an amount sufficient to provide at least 3 moles of carbon for each 2 moles of sodium nitrate.

References Cited in the file of this patent

UNITED STATES PATENTS

| 2,187,750 | Marvin | Jan. 23, 1940 |
| 2,256,536 | Udy | Sept. 23, 1941 |
| 2,751,307 | Armant et al. | June 19, 1956 |